United States Patent [19]
Seksaria et al.

[11] Patent Number: 5,171,074
[45] Date of Patent: Dec. 15, 1992

[54] LOW INERTIA TRACK LAYING WHEEL

[75] Inventors: Dinesh C. Seksaria, Murrsyville; Jan L. Teply, Monroeville, both of Pa.

[73] Assignee: Aluminum Company of America, Pittsburgh, Pa.

[21] Appl. No.: 728,332

[22] Filed: Jul. 11, 1991

[51] Int. Cl.$^5$ ............................................. B62D 55/10
[52] U.S. Cl. ........................................ 305/24; 305/56; 301/64.7; 301/64.3
[58] Field of Search ...................... 305/21, 24, 27, 28, 305/56, 57; 301/63 PW, 65, 63 DD

[56] References Cited

U.S. PATENT DOCUMENTS

| 2,943,889 | 7/1960 | Woldring et al. | 301/63 DS |
| 4,424,842 | 1/1984 | Trebaol | 301/65 X |
| 4,572,587 | 2/1986 | Komp et al. | 305/28 X |
| 4,607,892 | 8/1986 | Payne et al. | 305/56 |

FOREIGN PATENT DOCUMENTS 1939239 9/1977 Fed. Rep. of Germany ........ 305/56

Primary Examiner—Russell D. Stormer
Attorney, Agent, or Firm—Elroy Strickland

[57] ABSTRACT

A light weight road wheel having a relatively low mass moment of rotational inertia for use in a vehicle having an endless track. The wheel includes an inner metal member having a peripheral groove for receiving guide cleats of an endless track, and opposed peripheral rims having inner annular wall portions disposed against surfaces of said inner metal member. The rims are made of a fiber-reinforced composite material. Means are provided for securing the inner member and rim portions together. Elastomer tires secured to the outside surfaces of the rims, and segmented wear pads are located on inwardly facing surfaces of the peripheral groove.

5 Claims, 3 Drawing Sheets

LOW INERTIA TRACK LAYING WHEEL

BACKGROUND OF THE INVENTION

The present invention relates generally to road wheels for track laying vehicles and particularly to a hybrid wheel structure that has both low mass-moment of inertia and high strength. A road wheel is distinguished from a drive wheel and idler wheels of track laying vehicles in that the drive wheel is a sprocket device that engages track lugs to translate the track and thereby move the vehicle. Idler wheels are located beneath the upper horizontal extent of the track to support the upper extent against vertical sagging.

In order to lighten the road wheels, which receive the "ground load" from the tracks of track laying vehicles, and thereby lighten the vehicle on which the wheels are employed, a variety of proposals have been made. In U.S. Pat. No. 4,349,234 to Hartmann an all aluminum wheel is disclosed, whereas U.S. Pat. No. 4,607,892 to Payne et al. proposes the use of all aluminum or all fiber reinforced resin wheels.

In reviewing materials and manufacturing proposals for making road wheels a number of important considerations are needed. Aluminum road wheels, for example, comprise two back-to-back, deep, cup-shaped cylinder structures that are made by deep forging of heated aluminum work pieces. "Hot" forging processes require special dies and costly special forging alloys that are needed to withstand the severity of the forging process.

The all fiber reinforced composite wheel, which has a lighter density than aluminum alloys, may not necessarily be lighter in weight than an all aluminum wheel. This is because the fiber reinforced material does not have the strength and performance capabilities of aluminum. A greater amount or volume of fiber reinforced material is therefore generally needed to meet performance requirements.

For example, the loads in the area of the hub of a road wheel are substantially greater than in the rim area. In order to care for strength and performance in the hub area, when using fiber reinforced materials, it is necessary to increase the thickness of the fiber reinforced materials. Hence, in an all composite wheel, the savings in weight provided by its lower density may be offset by the increase in the volume of composite material needed to meet performance requirements.

Composite materials are generally more costly than aluminum alloys. The cost per pound of composite materials for these kinds of application is generally two to three times more expensive than appropriate aluminum alloys. Hence, the material of an all fiber reinforced wheel would appear to be substantially more expensive than an all aluminum wheel. However, comparative costs of the two wheels tend to equalize because of the higher manufacturing costs involved in deep forging aluminum workpieces to form the cup shape of the road wheel.

In the case of the above Hartmann patent, continuous steel rings are employed as wear resistant surfaces in the cleat receiving groove of the wheel. This locates the heavier masses of the steel rings in a position of the wheel that increases its mass moment of inertia, rather than decreasing it. In the Payne et al. patent, continuous wear rings are made of a resin matrix containing such materials as graphite, shot, particulate steel or ceramic. The rings are permanently secured to or integrally formed with the structure of the wheel. If such a ring is worn or damaged, the entire wheel is replaced in order to replace a worn ring with a new one.

SUMMARY OF THE INVENTION

The present invention is directed to a hybrid wheel in which the outer periphery thereof includes a rim made of light weight fiber reinforced composite material so that the rotational inertial mass of the rim is low, while the inner area of the wheel comprises a metal, preferably aluminum, plate or disc, which is generally stronger and stiffer than the reinforced composite material. In this manner, the mass of the heavier metal is located near the wheel center, where it has less influence on rotational inertia, and the overall weight of the wheel is lighter. The weaker composite material, on the other hand, is located in that portion of the wheel where strength requirements are relatively low.

By limiting the use of the composite material to the rim area of the wheel, the cost of the more expensive composite material is thereby limited. By using an aluminum center portion in the wheel, the lower cost of aluminum is taken advantage of, thereby lowering the cost of the wheel over that of an all fiber-reinforced composite wheel.

Further, deep forging is eliminated, as a relatively simple disc-like shape can now be used for the center portion of the wheel, which can be made from less expensive alloys using less expensive manufacturing processes. For example, a disc might still be forged but by the less expensive cold forging processes. Or, the disc can be formed by a spinning process or even cast or by other relatively low cost processes. All such processes can utilize aluminum alloys that are less expensive than deep forging aluminum alloys. The less expensive alloys, however, still provide the strength and stiffness needed in the hub area of the road wheel, while the periphery of the wheel, which incurs the lesser stresses in service, is provided with the light weight composite material.

It is therefore an objective of the invention to engineer not only the mass moments of inertia in road wheels but to also engineer the economics of the wheel.

In a preferred embodiment of the invention, two outer light weight rims are sandwiched between two inner discs in a manner that provides broad bearing areas between faying surfaces of the rims and discs. ("Faying surfaces" generally are those surfaces that are fitted and held together; in the present case the components of the sandwich are secured together in ways presently to be discussed).

The invention includes further the disposal of light weight, segmented bearing pads on the inside surfaces of the cleat receiving groove of the wheel. Such pads are connected to the rim or disc of the wheel in a manner that allows individual pads to be removed and replaced when they become worn or damaged. This permits repair of the pads without replacing the entire wheel or the entire rim or even an entire bearing ring.

In a typical military tank, for example, there are fourteen road wheels, with each wheel comprising two back-to-back, cup-shaped wheel portions. Hence, with this many wheels and wheel components, any lightening of the wheels and wheel components reduces appreciably the overall weight of the vehicle. Such reduction in weight provides improved fuel economy and operational range. Ride and handling are improved, since a lighter vehicle travels over rough terrain with less jarring, i.e., each road wheel is mounted at the end of cantilevered road arm, and hence now acts in a manner of a lighter hammer. Less jarring beneficially effects the life and reliability of electronics and other sensitive devices located within the vehicle. The improved ride also improves the working conditions of personnel within the vehicle, and will improve gun aiming accuracy. In addition, requirements upon the vehicle's power train, suspension, brakes and other subsystems are less severe, further permitting a reduction in the weight and cost of those components.

THE DRAWINGS

The invention, along with its objectives and advantages, will be better understood from consideration of the following detailed description and the accompanying drawings in which.

PREFERRED EMBODIMENTS

Figure 1:
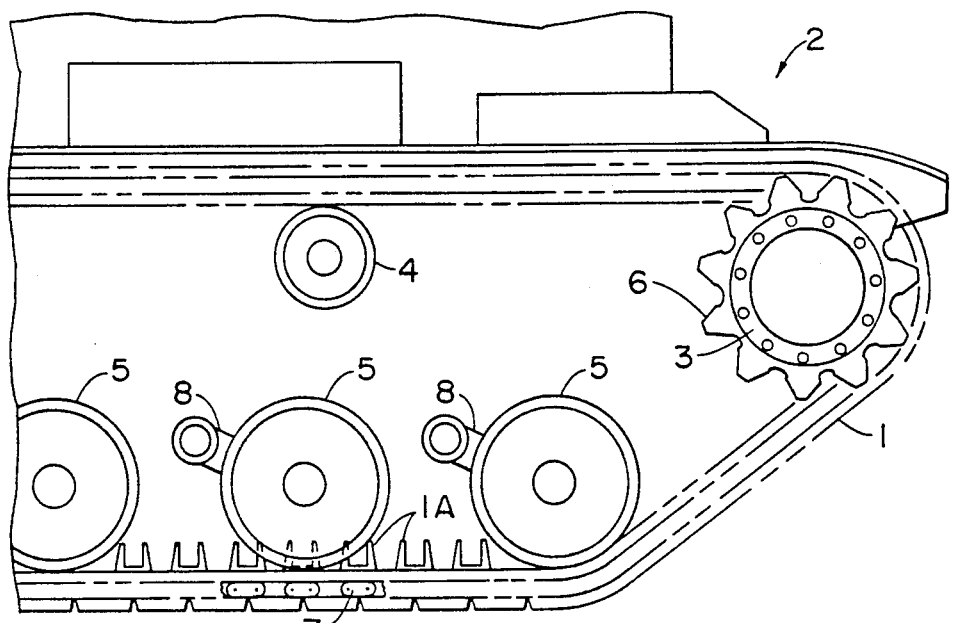
FIG. 1 is a partial side elevation view of the track and wheels of a track laying vehicle.

Referring now to the drawings, FIG. 1 thereof shows in elevation an endless track 1 of a track laying vehicle 2, and three different types of wheels employed in connection with the track, namely, a drive wheel 3, an idler wheel 4, and road wheels 5. As discussed earlier, drive wheel 4 has sprockets 6 that engage lugs 7 of the track to propel the vehicle. Idler wheel 4 supports the upper horizontal extent of track 1, and thereby keeps it from sagging under its own weight, while road wheels 5 ride on the lower horizontal extent of the track, and receives the "ground load" of the vehicle. The road wheels also receive cleats 1A, as discussed hereinafter.

The road wheel is the concern of the present invention. In track laying vehicles, the vehicle weight is supported by many pairs of road wheels, as discussed above. Each pair of wheels is free to rotate about its spindle at the end of a cantilevered road arm 8 (FIG. 1), which arm is connected to the vehicle hull through a torsion spring and shock absorber system. Because of the large number of road wheels, an individual wheel experiences a low static load, the vehicle thereby applying low ground pressure on the terrain. However, the dynamics of a tank traversing rough ground and obstacles at high speeds causes the road arms to swing and amplify the load on the wheels. The magnitude of the weight and mass moment of inertia of each wheel further aggravates impact loading on the suspension system, as the wheel operates at the end of cantilevered arm 8. Such suspended wheels cause a rough ride for the vehicle occupants and causes additional wear and tear on suspension components. In addition, the inertia of free spinning wheels wastes energy and fuel, as they slow down and speed up with each bounce of the vehicle.

The design of the wheel of the present invention, as thus far described, employs a hybrid materials approach, selecting each material for optimum utilization of its inherent characteristics. A tough, high ductility aluminum alloy such as Alcoa's aluminum alloy 6013 is preferred in the center portion of the wheel where its higher strength and elastic modulus is required; its higher density is closest to the wheel center thereby having the least detrimental influence on the wheel's mass moment of inertia. Composite materials are used in the rim area to take advantage of their lower density, which thereby provides the lower weight and mass moment of inertia. Similarly, light weight segmented ceramic pads are employed (to resist wear from the track cleats) which do not add significant mass moments of inertia in the rim area of the wheel.

Figure 2:
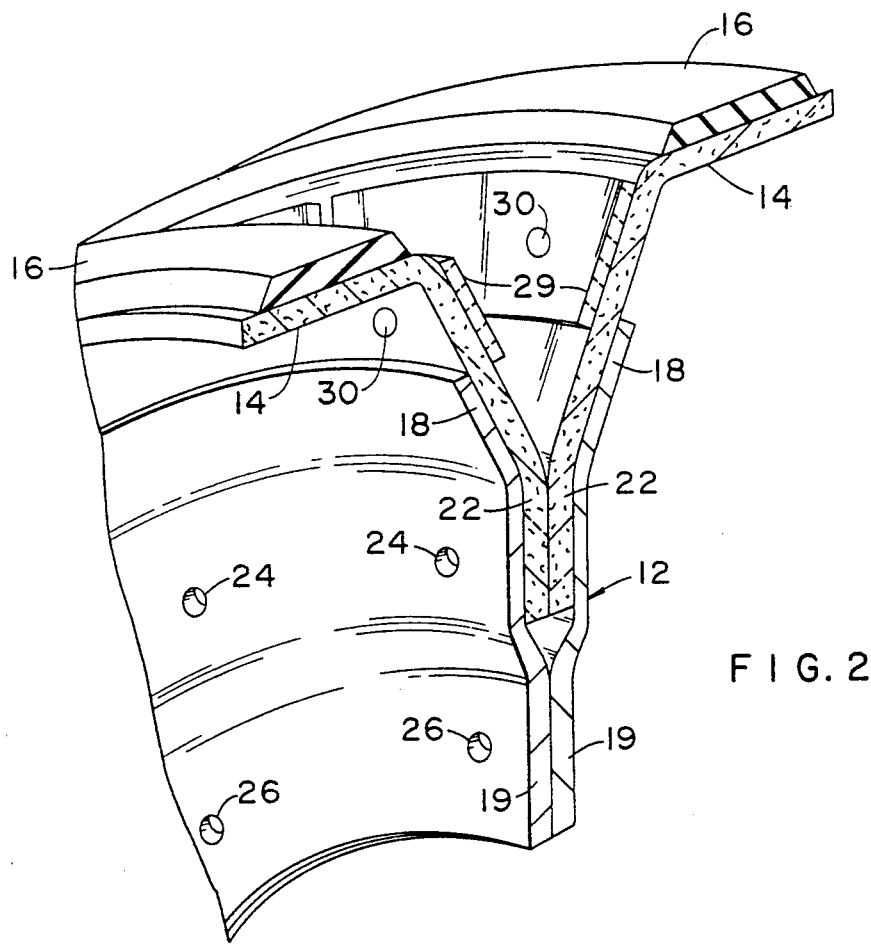
FIG. 2 is a partial perspective view of one embodiment of the hybrid wheel of the invention.

Referring now to FIG. 2 of the drawings, a portion of the hybrid wheel of the invention is shown in perspective, the wheel being generally designated by numeral 10. Wheel 10 comprises an inner metal disc or hub portion 12, opposed outer annular rims 14 made of light weight fiber reinforced composites, and solid elastomer tires 16 located on and secured to outer surfaces of the rims.

Tires 16 can be molded directly on rims 14 or be separately made and then adhesively bonded to the rims.

Figure 3:
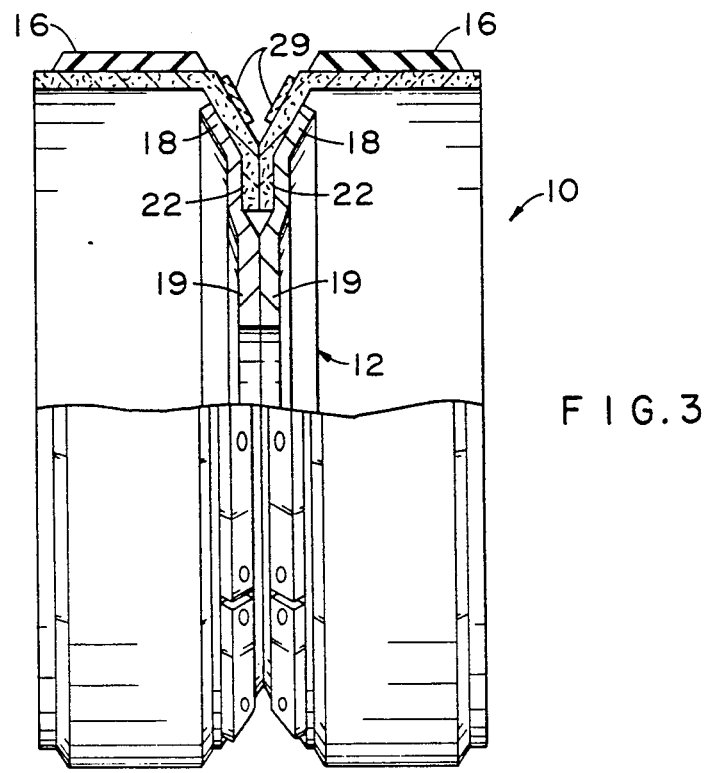
FIG. 3 is a one-half sectional, one-half elevation view of the wheel of FIG. 2.

As shown in FIGS. 2 and 3, inner disc portion 12 of wheel 10 consists of two, back-to-back plates, each provided with lateral offset wall portions 18 located at the periphery of center wall portions 19. Offset portions 18 provide an annular groove between them. In FIGS. 2 and 3, an annular groove is also located between inner, integral wall portions 22 of rims 14 that angle outwardly to the rims.

In the embodiment of FIGS. 2 and 3, the integral wall portions 22 of the rims extend inwardly into the groove between offset wall portions 18, and are appropriately secured therein. The area of the faying surfaces of 18 and 22 is substantial and thus provide surfaces that can be conveniently secured together by appropriate adhesives. The use of adhesives, however, limits the ability to separate wheel components for maintenance purposes. On the other hand, adhesive joining of 18 and 22 allows elimination of mechanical fasteners to secure the components together, though both means or either means, or welding or like fastening means can be used.

The rims and discs of wheel 10 are preferably secured by removable mechanical fasteners, such as by a circle of bolts and nuts (not shown in FIGS. 2 and 3), the bolts extending through openings 24 of a circular array of such openings provided in offset walls 18 and in walls 22. The inner discs 12 of the wheel are secured together at locations 26 inside the circle of openings 24 by studs 27 (FIG. 4) contained in a wheel hub (not shown) located on the cantilevered end of road arm 8.

Figure 4:
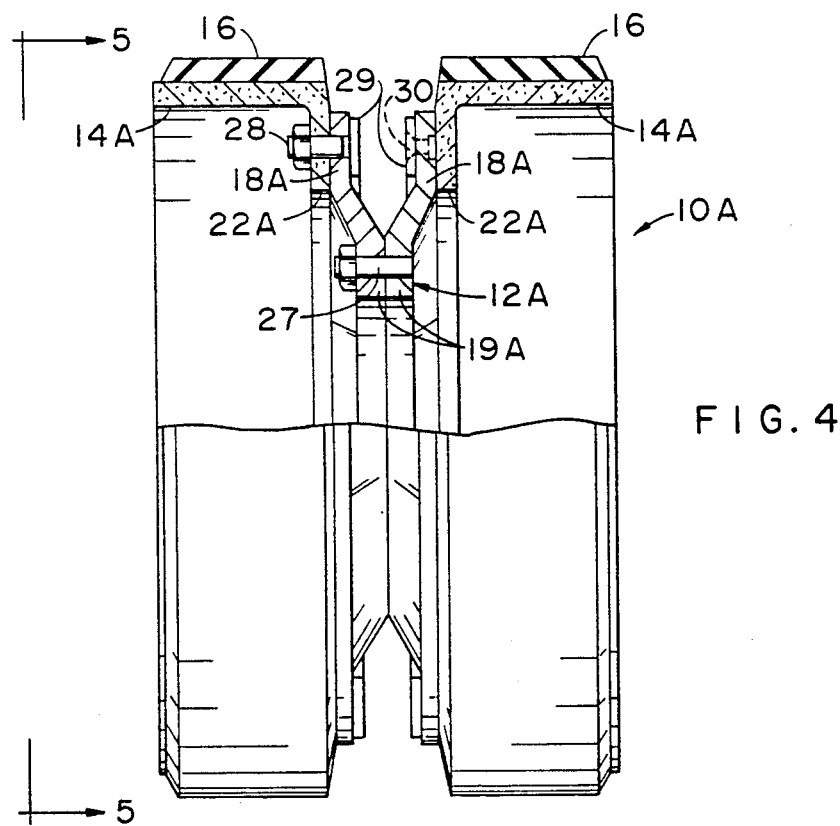
FIG. 4 is a one-half sectional, one-half elevation view of the second embodiment of the invention.
Figure 5:
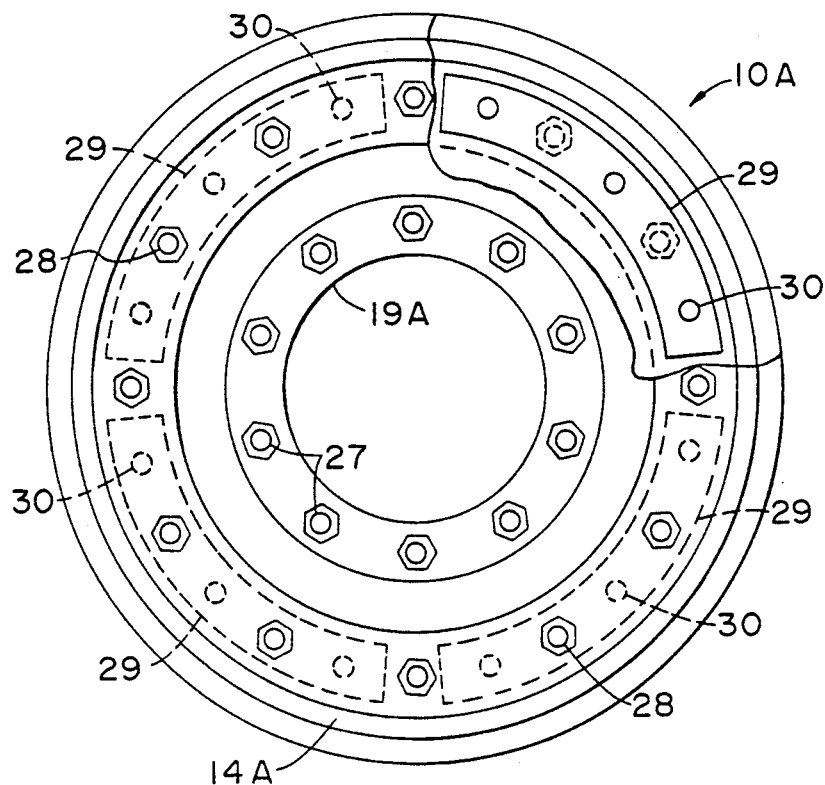
FIG. 5 is a side elevation view of the wheel of FIG. 4 taken along lines 5—5 in FIG. 4.

The embodiment of FIGS. 4 and 5 of the drawings shows a wheel 10A with fiber reinforced composite rims 14A secured to the outside surfaces of back-to-back center discs 12A. As shown, an outer circle of bolts 28 (and associated nuts) secure the components together in a manner similar to that of FIGS. 2 and 3. The back-to-back discs are bolted together by an inner circle of studs 27, as discussed earlier in connection with FIG. 2. Because the composite rims 14A are secured to the outer surfaces of the hub discs 12A, the rims do not have and do not need as large a web portion 22A, as does the embodiment of FIGS. 2 and 3.

Preferably, as shown in FIGS. 2 through 4, the gauge or thickness of offset walls 18 and 18A of discs 12 and 12A is thinner than center wall 19 and 19A to further reduce the weight and rotational inertia of wheel 10, i.e, the thicker and therefore heavier portions of 19 and 19A are relatively close to the axis of rotation of the wheel so that their inertias do not affect substantially the overall rotational inertia of the wheel.

In both embodiments of the invention, wheels 10 and 10A are provided with segmented wear pads 29. In FIGS. 2 and 3, the pads are located on inwardly facing surfaces of rim portions 22 to engage guide cleats 1A (FIG. 1) of the track. The pads are circumferentially spaced apart on the respective inward surfaces of 22, and are secured thereto by means that permits individual removal of any one or more of the pads after sufficient wear and/or damage has taken place without the need to remove unworn pads or the need to remove a rim, i.e., removal and replacement of individual pads leaves the wheel itself in tact so that a whole wheel is not discarded because of a component being worn or damaged.

A preferred way to secure the pads to the wheel is by flat head rivets 30. The heads of the rivets are easily removed by a simple drilling operation when it becomes necessary to exchange an old pad for a new one.

In addition, if a rim 14 is damaged, it too can be separated from a center disc by removal of bolts 28 and replaced without replacing the center disc. Similarly, if a disc 12 or 12A is damaged it can be removed from the vehicle, separated from its corresponding rim and replaced without replacing other components of the wheel. If a solid tire 16 is worn or damaged, the rim can be separated from the disc (again by removing bolts 28) and returned to the manufacturer for replacement of the tire. The manufacturer removes the worn or damaged tire, secures a new tire in place and returns the unit to the vehicle owner. The hybrid design of the invention thus reduces substantially the cost of wheel maintenance. The cost savings for the military, for example, can be significant when one considers the large number of track-laying vehicles it possesses.

The embodiment shown in FIGS. 4 and 5 of the drawings as segmented wear pads 29 located on the inwardly facing surfaces of wheel discs 12A. The wear pads in both embodiments, i.e., in FIGS. 2 and 3 and in FIGS. 4 and 5, are circumferentially spaced apart, as shown. Four such pads are shown in FIG. 5, though a lesser or greater number of pads can b used.

The material of pads 29 is preferably ceramic, as ceramic materials are hard and dense while simultaneously being light in weight. In addition, ceramic wear pads can be made by manufacturing processes that are traditional in the ceramic industry. Other light weight materials, however, can be used. These include metal matrix materials, metal frictional materials, such as used in vehicle brake pads and linings, and carbides. Hardened steel segmented pads can also be used, though the mass of steel makes it less desirable than the above materials, which are considerably lighter in weight.

In one design version of wheel 10, maximum rim deflections under maximum ground load conditions are approximately two-thirds that of the present all-metal wheel when using a carbon fiber reinforcement in the composite of rim 14. The use of glass fiber reinforcement results in a maximum deflection of the rim that, under the same load conditions, exceeds by 16% target deflection resistance of the same all metal wheel. Some deflection is necessary to reduce jarring of the vehicle, yet undue deflection can cause wear and tear to the rim and tire.

The mass moment of inertia of the wheel of the invention is approximately fifty percent of that of an all aluminum wheel. Stresses about bolt holes 26 in discs 12 and 12A are sufficient for the desired life of the wheel.

The embodiment of the wheel of FIGS. 2 and 3 has greater strength and endurance than that of FIGS. 4 and 5 since its construction provides broad bearing areas sandwiched between rim portions 22 and disc portions 18. Such bearing areas reduce tensile stresses in bolts 28, i.e., when ground reaction forces are applied against the rim, the forces are substantially in the plane of the bearing surfaces so that the bolts are not placed in substantial tension; the force on the bolts is greater in shear. The bulk of the forces, of course, are against the broad bearing surfaces provided by the inner discs in the hub area of the hybrid wheel. Space limitations, however, may limit the use of the wheel of FIGS. 2 and 3, as such a wheel tends to be wider than that of the FIGS. 4 and 5 embodiment.

Figure 6:
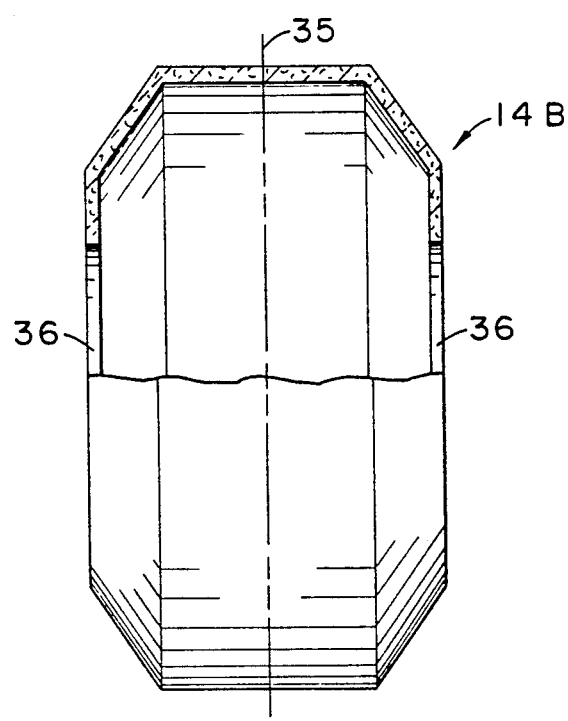
FIG. 6 is a half sectional and half elevation view of a fiber reinforced composite cylinder from which the rims of the hybrid wheel of FIGS. 2 through 5 can be made.

FIG. 6 of the drawings shows a cylindrical article 14B that is made by winding high strength filaments on a typical mandrel assembly (not shown). The purposes of such a process is to economically and simultaneously form two composite rims 14 or 14A. The filaments of the winding are coated with at least one layer of polymer material, such as epoxy. After the winding process, the article is heated and cured on the mandrel assembly, the heating process setting the polymer coatings to form a single cylindrical structure. After curing, the structure is severed along line 35 in FIG. 6 to separate the cylinder from the mandrel assembly and to provide the two circular rims shown in FIGS. 2 to 5. The mandrel assembly provides the cylinder with openings 36 that will accommodate center discs 12 when wheel 10 is assembled.

While the invention has been described in terms of preferred embodiments, the claims appended hereto are intended to encompass all embodiments which fall within the spirit of the invention.

What is claimed is:

1. A light weight wheel having a low mass moment of rotational inertia, comprising
   inner, back-to-back metal discs adapted to be secured to a hub by a plurality of circumferentially spaced hub studs, said back-to-back discs forming a peripheral groove for receiving guide cleats of an endless track,
   opposed peripheral rims having inner annular wall portions located in said groove and disposed against inwardly facing surfaces of said metal discs to form a sandwich of said inner wall portions and metal discs,
   said rims being made of a fiber-reinforced composite material,
   means securing the metal discs and inner rim portions of the sandwich, and
   elastomer tires secured to the outer surfaces of said rims.

2. The wheel of claim 1 in which the means securing the metal discs and rim wall portions together is an adhesive material located between faying surfaces of the discs and rim wall portions.

3. The wheel of claim 1 in which the means securing the discs and wall portions together is a circle of fasteners, with each fastener extending through the discs and wall portions.

4. A light weight wheel having a low mass moment of rotational inertia, comprising
- two inner back-to-back metal discs adapted to be secured together by a plurality of wheel studs, said metal discs forming a peripheral groove for receiving guide cleats of an endless track,
- opposed peripheral rims having inner annular wall portions disposed against outer annular surfaces of said metal discs, said rims being made of a fiber-reinforced composite material,
- a plurality of fasteners extending through the inner wall portions of said rims and the metal discs to secure the rims and discs together, and
- elastomer tires secured to the outer surfaces of said rims.

5. A light weight wheel having a low mass moment of rotational inertia, said wheel comprising:
- aluminum members forming the center portion of said wheel, said members having a pair of wall portions extending therefrom in a radially outward direction to form a peripheral groove therebetween,
- opposed, peripheral, fiber-reinforced composite rims having radially extending inner annular wall portions disposed against surfaces of the outward wall portions of said aluminum members,
- a plurality of fasteners extending through said inner and outward wall portions securing said rims to the center portion of said wheel,
- a plurality of segmented wear pads disposed on opposed surfaces within said peripheral groove, and
- elastomer tires secured to outer surfaces of said rims.

* * * * *